J. W. WALLIS.
PROJECTOR.
APPLICATION FILED SEPT. 20, 1920.

1,402,816.

Patented Jan. 10, 1922.

INVENTOR.
John W. Wallis
BY
Frederick Whyte
ATTORNEY

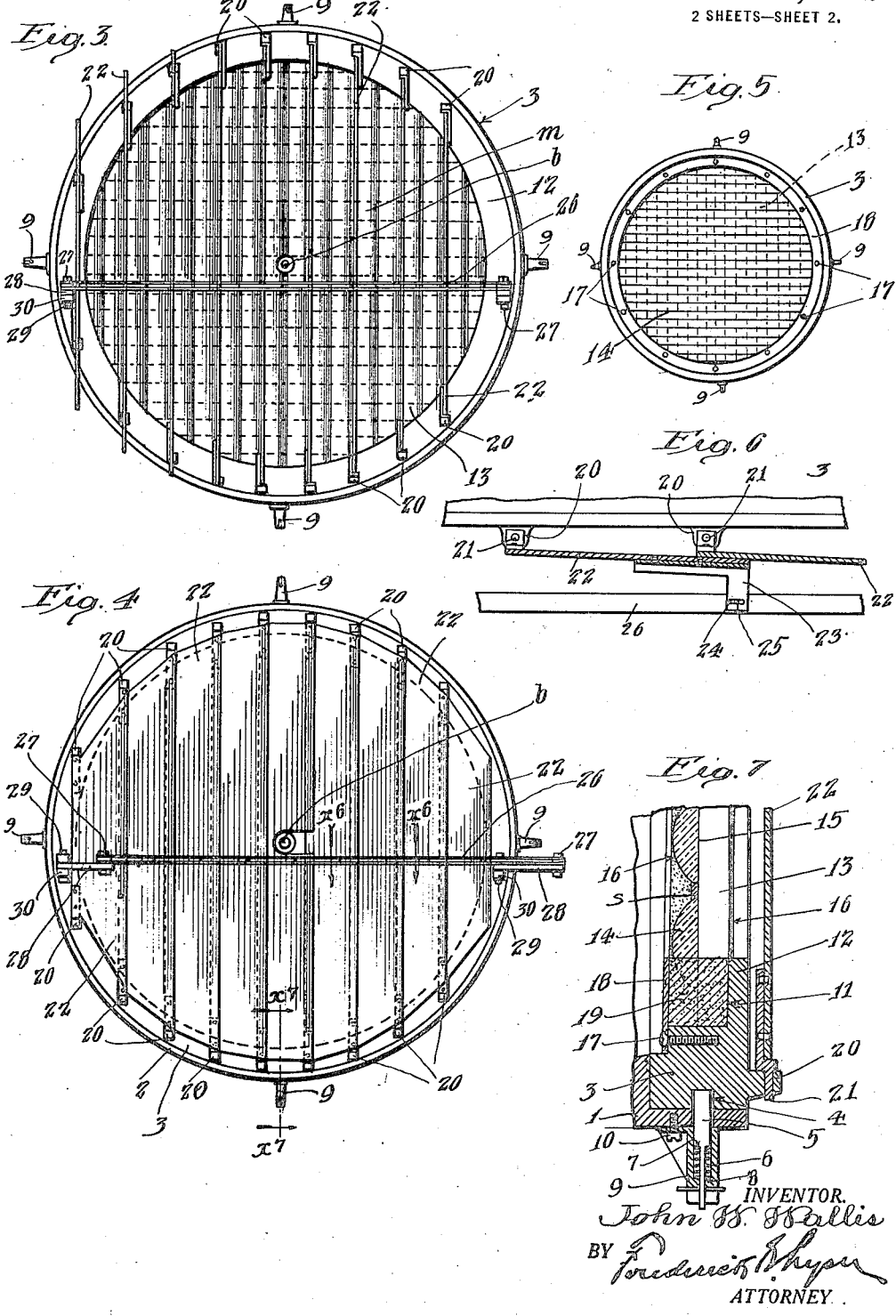

UNITED STATES PATENT OFFICE.

JOHN W. WALLIS, OF LOS ANGELES, CALIFORNIA.

PROJECTOR.

1,402,816.

Specification of Letters Patent. Patented Jan. 10, 1922.

Application filed September 20, 1920. Serial No. 411,384.

*To all whom it may concern:*

Be it known that I, JOHN W. WALLIS, a citizen of the United States, residing at Los Angeles, county of Los Angeles, State of California, have invented a new and useful Projector, of which the following is a specification.

This invention relates to a method of controlling artificial radiations in the illuminating and photographic arts, and the invention is especially useful in motion picture photography, since, in such photography it is very desirable to provide for quickly obtaining a delicate balance or a definite relation in the intensity of radiation between the different sources; as well as to quickly define the area over which the radiation from a given source is to be distributed.

Owing to the constantly varying mean frequency and intensity of the sun's radiation at any given point on the earth's surface, as well as the variation in the angle of incidence of the sun's radiation throughout the day; and also because of the absence of any practicable method of controlling any of these variables, motion pictures are photographed, when practicable, by artificial radiation. This artificial radiation, in practice, is either used in conjunction with the radiation from the sun; or it is used in dark stages or at night without being augmented by radiation from the sun.

The usual method of obtaining photographic gradation of light, shade and shadow and the resulting depth and artistic appearance of a photograph, is to vary the direction, diffusion and intensity of the radiation striking the various parts of the objects within the field of view of the camera.

The most economical source of artificial radiation for motion picture photography is the electric arc of either the mercury or the carbon type. Both of these types of electric arc are in daily use in the motion picture industry, but the constant increase in size of the area required to be illuminated for photographing has made it advisable to employ large and intense sources of projected radiation.

At present the largest and most intense source of projected radiation is the high intensity electric arc projector of the new type used in the Army and Navy of the United States Government. This projector has the crater in fixed relation to the focal point of a parabolic mirror, while the lamp mechanism and mirror are mounted in fixed positions relative to one another so that they may be cooled by an air motor or other means. This construction prevents the radiation from being spread or concentrated by moving the crater of the positive electrode along a line coinciding with the axis of the mirror.

The method now in vogue for spreading and concentrating the radiations in the older type arc projectors, is to move the source of radiation in line with the axis of the mirror, toward and from said mirror. The serious disadvantages of this method for illumination in motion picture photography are:

(a) When the source of radiation is moved away from the focal point along the axis of the mirror to a greater distance from the mirror than the focal length of such mirror, a very large portion of the radiation misses the mirror and strikes the inner surface of the lamp drum and is therefore not projected out of the drum. Such portion of the radiation is therefore lost.

(b) When the source of radiation is moved along the axis of the mirror to a shorter distance from said mirror than the focal length thereof, a large portion of the radiation strikes the marginal portion of the mirror and is reflected upon the inner surface of the drum and therefore is not projected out of the drum. This portion of the radiation is therefore lost.

The method now in vogue in motion picture photography for diffusing the radiation from the old type arc projector is to project the radiation through diffusing media such, for example, as frosted glass, tracing linen, cheese cloth or gelatin paper. The disadvantages arising from the practice of these methods are:

(a) No definite degree of diffusion can be obtained.

(b) The radiations transmitted by such media cannot all be directed into any prescribed area, but a portion of the radiation is deflected in various directions in front of the plane of the diffusing medium employed.

(c) The different media do not transmit with equal ratio the various frequencies emitted by the source of the radiation, which results in a different mean frequency for each medium used. Variation in mean frequency produces variation in the color value, thus making it difficult, if not impossible, for the camera operator to properly judge and regulate the intensity of the radiation striking the objects lying within the field of view of his camera.

The method now in vogue for varying the quantity or intensity of radiation emitted by a given source is to employ an iris diaphragm or other opaque object movable into the beam or path of radiation. The disadvantage of this method is that the diaphragm or other member interrupts all of the rays emitted from a given portion of the source of radiation, changing in effect the size of such source and thereby changing the character of the shadow in the resulting negative.

Objects of this invention are to overcome the various difficulties and disadvantages mentioned above.

The accompanying drawings illustrate the invention:

Fig. 3 is a front elevation of Fig. 1.

Fig. 4 is a front elevation of Fig. 1 with the shutter closed.

Fig. 5 is a reduced rear elevation of the lens and its mounting.

Fig. 6 is an enlarged sectional plan view on line indicated by $X^6 X^6$ Fig. 4.

Fig. 7 is an enlarged sectional elevation on line indicated by $X^7 X^7$ Fig. 4.

Figure 1:
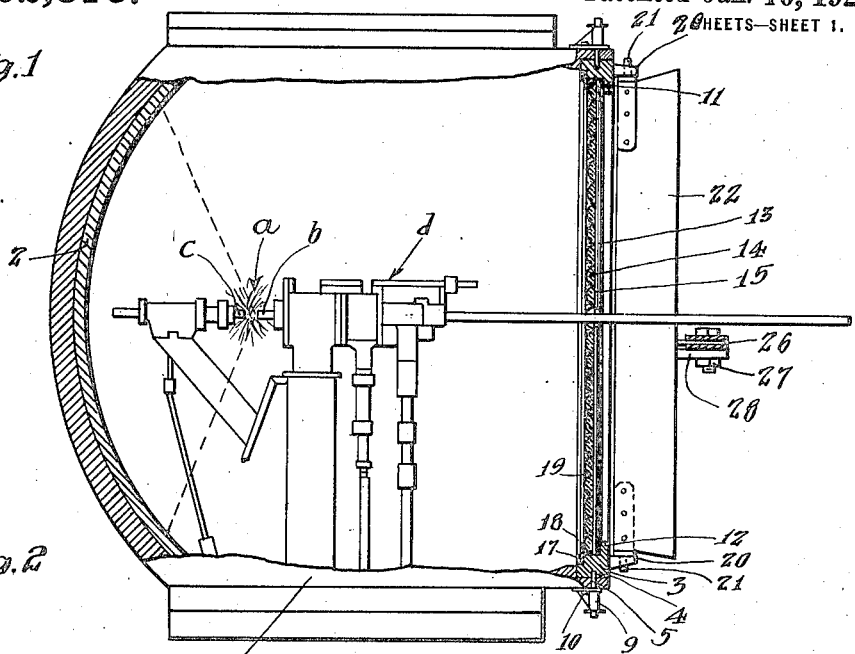
Figure 1 is an elevation, mainly in vertical mid-section, of a projector constructed in accordance with the provisions of this invention, the shutter being shown in open position.

The radiation source is indicated in Figure 1 by the character $a$, such source being in this instance a high intensity arc formed by passing a suitable electric current through the positive and negative electrodes $b$, $c$ of an arc lamp, indicated in general by the character $d$. There is provided a suitable drum 1 within which the lamp $d$ is mounted. At its rear end the drum 1 is provided with a suitable mirror 2, preferably of the parabolic type. The parts just described are old and the invention proper is constructed as follows:

The drum 1 is provided at its front end with a rotative lens mounting 3 in the form of a ring, which fits inside of the drum. The ring is provided in its periphery with an annular groove 4 into which projects a number of latch pins 5 for holding the ring against endwise movement relative to the drum, said pins permitting the ring to be rotated relative to the drum. Each of the pins 5 is held in ring-engaging position by a spring 6 which seats at one end against a shoulder 7 on the pin and at its opposite end against a shoulder 8 inside of a spring chamber 9 that is fastened by screws 10 to the periphery of the drum 1. This construction is clearly shown in Fig. 7.

The ring is provided with an internal annular groove 11 which is terminated forwardly by an annular shoulder 12. A system of lenses is mounted in the groove 11 and comprises two series or sets of cylindrical lenses, an outer series of lenses 13 and an inner series of lenses 14, the inner and outer lenses being arranged crosswise or substantially at right angles to each other in parallel planes. The lenses 13, 14 are provided with plane faces 15, the faces 15 of opposing strips contacting with each other. The lenses 13, 14 have their other faces 16 ground convex and each lens is thus a converging or positive lens.

The convex faces 16 of the lenses may be of any desired curvature according to the results desired. The lenses 13 may be of the same curvature as the lenses 14 or may be of a different curvature. In the instance shown in the drawings the lenses 13 are wider and are of less curvature than the lenses 14; and the lenses 13 are of such curvature as to converge the rays at an angle of approximately twenty degrees and the lenses 14 are of such curvature as to converge the rays at an angle of approximately forty degrees. The joints between the adjacent lenses of each series are closed by suitable cement indicated at $s$. The cement $s$ is not necessary but it serves to prevent the entrance of dust between the lenses 13, 14.

Fastened to the inner face of the ring 3 by screws 17, or their equivalent, is an annulus forming a flange 18 opposite the shoulder 12 to prevent the lens from movement away from said shoulder. Whatever space there is between the shoulder 12 and the flange 18 not occupied by the lenses 13, 14 is filled with cement, plaster of Paris or other suitable binding material 19 for preventing any looseness of fit of the lenses in their mounting.

From the foregoing it is clear that the source $a$ will produce radiation which will be reflected by the mirror 2 through the lenses; that each lens receives a certain portion of the radiation and spreads or diffuses it over a comparatively large area; and that the portion of the radiation emerging from any one of the lenses will illuminate substantially the same area as is illuminated by the portion of the radiation emerging from any other lens. Furthermore, the radiation impinging upon each lens 14, excepting in the longitudinal midplane of said lens, is refracted by said lens toward said plane, and then the radiation thus refracted is again refracted by the lenses 13 into a series of separate beams, one beam from each lens 13, the refraction by each of the lenses 13 being only toward the longitudinal mid-plane of said lenses. One set of the lenses converges the radiation one way and then the other set of lenses converges these refracted beams the other way. Thus the crossing portions of any two of the lenses 13, 14 will so refract a portion of the radiation as to produce a beam having a cross section in the form of a parallelogram, two of the opposite sides of the parallelogram being inversely proportional in length to the focal length of the lens 14 and the other sides of the parallelogram being inversely proportional in length to the focal length of the lens 13. Any one of the beams from an area $m$ is in two rows of beams extending in different directions normal to the axes of the beams, and the beams are spread or diffused over substantially the same area. We thus get a plurality of beams from a single source, all of which are brought to a focus in the plane indicated at $e$ in Fig. 2. The radiations crossing in the plane $e$ spread or are diffused and when the source $a$ and lenses are placed at the appropriate distance from the objects to be illuminated, the different beams merge with one another so as to produce a single projected diffused beam of the shape determined by the relative curvatures and angular relation of the lenses 13, 14. In this instance, because of the angular relation of the lenses 13, 14, each beam will be rectangular in cross-section and, since the beams merge, the area illuminated by the merged beams will be a rectangle.

With the lenses 13 in vertical position and the lenses 14 horizontal, as in Fig. 3 of the drawings, the illuminated rectangle will be positioned with its longer axis vertical. By rotating the ring 3 it is clear that the illuminated rectangle may be positioned with its longitudinal axis lying any desired number of degrees from the vertical or horizontal. This is of great advantage for illuminating certain prescribed areas which are to be photographed. For example, a stairway may be illuminated, together with the space immediately above the stairway, by turning the ring 3 so as to cause the lenses 13 to lie substantially parallel with the general slant of the stairway.

The above described construction will produce maximum illumination of the particular area to be photographed, but the radiation may be too intense and, in that event, it is desirable to reduce the intensity. I accomplish this by providing means for simultaneously cutting off or interrupting a portion of the radiation projected by each of the lenses and this construction is as follows:

The ring 3 is provided with a number of pairs of bearings 20, the bearings of each pair being arranged in axial alinement with one another on opposite sides of the ring. In each pair of bearings 20 are journaled pivots 21 of a shutter slat 22. The shutter slats may be of any desired width and in this instance are shown of sufficient width to shut off, when closed, all of the radiations transmitted by two of the lenses 13, and each shutter slat is enough wider to cause each slat to overlap the adjacent slat, when the shutter is closed.

It is preferable that the bearings 20 be positioned so that when the slats 22 are open, that is to say when they extend at right angles to the plane of the lenses, the slats will lie in planes passing through the cement joints $s$ at right angles to the plane of the lenses. By so positioning the shutter slats they obstruct none of the radiations when the shutter is in full open position as shown in dotted lines $f$, Fig. 2.

The slats 22 may be operated simultaneously, and for this purpose each slat is provided with an arm 23 having a slot 24 engaging a pin 25. The pins 25 project from an operatnig rod 26 which is pivoted at its opposite ends at 27 to arms 28 that in turn are pivoted at 29 to bearings 30 mounted on the outer face of the ring 3. It is clear that by this construction the shutter slats may be simultaneously operated by moving the rod 26 or arms 28 or any one of the slats; and that when the lenses are turned by turning the ring 3 the slats 22 will also be rotated about the longitudinal axis of the drum so that the relative parallel positions of the slats 22 and lenses 13 will not be changed. Thus, no matter to which position the lenses are turned, any desired volume of the radiation may be cut off by operating the shutter.

Though the shutter slats may be of any desired width, it is well to have them wider than a single lens so that the operator can easily know when the shutter is half closed and consequently know that the radiation issuing from the drum is one half the intensity of that when the shutter is in full open position. When the shutter is half closed, each slat obstructs all of the radiations projected by one of the lenses 13 of the pair which the shutter slat is designed to cover when the slat is in full closed position. The operator can easily determine by sight when the shutter is half closed by watching the outer edge of one of the slats when he is closing the shutter, and stopping the closing movement as soon as he notes that the outer edges of the slats are unilluminated. When the slats are open they lie entirely within the unilluminated zones indicated at $u$ in Fig. 2, and in closing the shutter each slat is moved first across the path of the beam from one lens 13 and then across the beam from the second lens 13 of the set controlled by said slat.

From the foregoing it will now be understood that the lens and shutter together form a projector door with the following provisions:

(a) Take any given area $m$ described by the crossing of any two lenses 13, 14, one belonging to each layer or series of the lenses. The radiation transmitted through this area of the door will be spread uniformly over approximately the entire area illuminated by the radiation from the lamp. In like manner all other similar areas of the door will transmit their portions of the radiation over approximately the same area illuminated by the radiation from the lens $m$. This produces a perfect source of diffused projected light for motion picture photography or other purposes. The term "approximately" is employed relative to the area illuminated by all of the lens areas $m$ for the reason that at the margin of the illuminated area the illumination will be blended off or gradually diminished in brilliancy outwardly for a few inches only. This is an advantage, since the illuminated objects at the marginal portions of the illuminated area will be vignetted into the background.

(b) The section of the beam at right angles to its axis forms a parallelogram whose angles depend upon the angle formed by the crossed lenses 13, 14. This feature enables all of the radiations to be fitted into the field of view of the camera by rotating the door until the area illuminated meets the requirements of the occasion.

Figure 2:
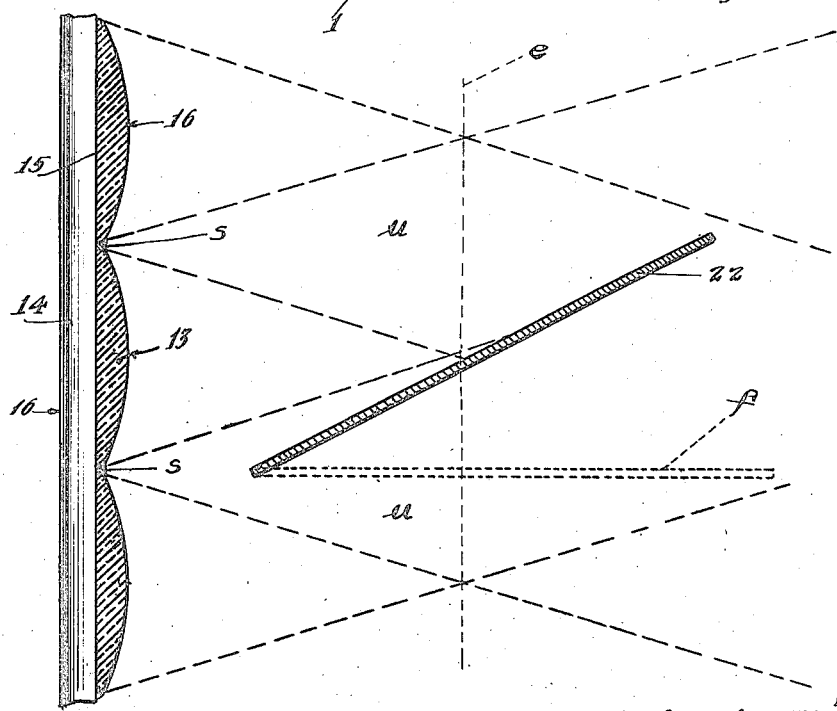
Fig. 2 is a diagrammatic view of a portion of the lens, the shutter being shown in solid lines in position to interrupt half of the radiations projected by the lens and full open in dotted lines.

(c) As the rays emerge from the outer panels 13, the rays emerging from any given panel are converged toward a plane passing through the center of that panel at right angles thereto, thereby causing the voids or dark spaces $u$ in which the shutter slats 22 lie when wide open, as indicated in broken lines $f$ in Fig. 2.

(d) In closing the shutter equal quantities of the radiation projected through different areas $m$ at different parts of the door are intercepted and absorbed by the slats 22, but because of the blending of the beams projected by the different areas $m$ there is a reduction in brilliancy over the entire area of illumination and not over merely certain portions of said area as would be the case if an ordinary lens were employed instead of the lenses 13, 14. This feature enables the intensity of the radiation to be varied from a maximum through an infinite number of intensities to zero without change in the size of the source, or apparent size of the source, and therefore without change of the character of the shadows produced in the resulting negative.

(e) In closing the shutter equal quantities of the radiation are intercepted by the different shutter slats, which have their inner faces blackened so that the slats absorb all of the radiation that strikes them. Therefore, that part of the radiation that passes through the openings between the shutter slats is permitted to strike the objects being photographed without changing in any way the mean frequency of the radiation as occur when a diffusing medium is employed as noted hereinbefore in paragraph (c) of the preamble. This feature enables the photographer to accurately adjust the strength of the radiation projected upon the area being photographed because the color of the radiation visible to him remains constant.

The above results are due to the separating of the radiation into a plurality of beams, spreading the separate beams to cause them to impinge upon the same area, and controlling the separate beams. The separate beams and the unilluminated inter-beam spaces form in cross section a checkerwork adjacent the plane of the lenses; and the shutter slats, when open, are positioned in certain of the inter-beam spaces and are movable across the beams so as to control the separate beams.

It is to be noted that with the construction and arrangement of the lenses described above the marginal portion of the area illuminated is graduated in intensity due to the fact that the outer marginal rays of the marginal lenses are the only rays striking the marginal portion of the area whereas the inner marginal rays and the more central rays of the marginal lenses and also all of the rays of the remaining lenses are uniformly distributed over all but the marginal portion of the area. The reduction of intensity of the light outwardly in the margin of the illuminated area is of advantage since thereby is produced a vignette effect in the negative and in the positive printed form such negative, which, when projected upon the exhibiting screen, causes the marginal portion of the scene on the screen to be unobtrusive so that the spectator witnesses the reproduced scene substantially as he would the actual scene from which the reproduction is being exhibited, that is to say with the marginal portion of the scene more or less obscure as the eye would see it in looking at the central portion of the scene.

I claim:

1. In a projector, the combination of two sets of cylindrical lenses, the lenses of one set being in front and crosswise of the lenses of the other set.

2. In a projector, the combination of a drum, a ring rotatively connected with the drum, and two sets of cylindrical lenses mounted in the ring, the lenses of one set being in front and crosswise of the lenses of the other set.

3. In a projector, the combination of two sets of cylindrical lenses, the lenses of one set being in front and crosswise of the lenses of the other set, and operatively mounted shutter slats, each of said slats when open being positioned in the unilluminated space in front of the joint between two adjacent lenses of one of the sets.

4. In a projector, a set of cylindrical lenses in edgewise relation, and operatively mounted shutter slats, each of said slats when open being positioned in the unilluminated space in front of the joint between two adjacent lenses.

Signed at Los Angeles, Calif., this 14th day of September, 1920.

JOHN W. WALLIS.

Witnesses:
GEORGE H. HILES,
L. BELLE WEAVER.